United States Patent
Hsu et al.

(10) Patent No.: US 10,607,051 B2
(45) Date of Patent: Mar. 31, 2020

(54) METHOD FOR SETTING TIRE PRESSURE MEASUREMENT DEVICE

(71) Applicant: ORANGE ELECTRONIC CO., LTD, Taichung (TW)

(72) Inventors: Chin-Yao Hsu, Taichung (TW); Min-Hsuan Chang, Taichung (TW)

(73) Assignee: Orange Electronic Co., Ltd, Taichung (TW)

( * ) Notice: Subject to any disclaimer, the term of this patent is extended or adjusted under 35 U.S.C. 154(b) by 0 days.

(21) Appl. No.: 15/809,260

(22) Filed: Nov. 10, 2017

(65) Prior Publication Data

US 2019/0147209 A1    May 16, 2019

(51) Int. Cl.
| | |
|---|---|
| *G06K 7/14* | (2006.01) |
| *B60C 23/04* | (2006.01) |
| *G06K 7/10* | (2006.01) |
| *G06Q 10/00* | (2012.01) |

(52) U.S. Cl.
CPC ........ *G06K 7/1417* (2013.01); *B60C 23/0472* (2013.01); *B60C 23/0479* (2013.01); *G06K 7/10554* (2013.01); *G06Q 10/20* (2013.01)

(58) Field of Classification Search
CPC .......................... B60C 23/0479; G06K 7/1417
USPC ....................................................... 235/462
See application file for complete search history.

(56) References Cited

U.S. PATENT DOCUMENTS

| | | | |
|---|---|---|---|
| 7,797,204 B2 * | 9/2010 | Balent ................ | G06Q 30/0633 705/28 |
| 9,050,862 B2 | 6/2015 | Mouchet | |
| 9,122,423 B2 | 9/2015 | McIntyre et al. | |
| 9,415,642 B2 | 8/2016 | Lefaure et al. | |
| 2011/0028885 A1 * | 2/2011 | Eggers ................ | A61M 5/1413 604/19 |
| 2014/0327534 A1 | 11/2014 | Donehue | |
| 2016/0325592 A1 * | 11/2016 | Tomakidi ............ | B60C 23/0471 |
| 2017/0345227 A1 * | 11/2017 | Allen, Jr. ............... | G07C 5/008 |
| 2018/0060008 A1 * | 3/2018 | Bender ................ | G09G 3/3225 |

FOREIGN PATENT DOCUMENTS

| | | |
|---|---|---|
| CN | 102712226 A | 10/2012 |
| CN | 104995044 B | 5/2017 |

OTHER PUBLICATIONS

Orange. Orange TPMS Manual. Sep. 10, 2016. Retrieved on Jul. 22, 2018 from <https://web.archive.org/web/20160910151253/http://www.orange-electronic.com:80/eu/download/manual/orange_p420a(product_manual).pdf>.*

TW Office Action dated May 25, 2018 as received in Application No. 106131837.

* cited by examiner

*Primary Examiner* — Toan C Ly

(74) *Attorney, Agent, or Firm* — Muncy, Geissler, Olds & Lowe, P.C.

(57) ABSTRACT

A method for setting tire pressure measurement device applicable for a detection device electrically couple to an image code scanner is provided. The method comprises the steps of: providing a look-up table (LUT) recording a plurality of image codes, each of the plurality of image codes corresponding to at least one piece of manufacture information, and the at least one piece of manufacture information corresponding to a vehicle; capturing one of the plurality of image codes by the image code scanner so as to generate a scanning result; and based on the scanning result, the detection device selecting one of a plurality of communication protocols.

10 Claims, 7 Drawing Sheets

METHOD FOR SETTING TIRE PRESSURE MEASUREMENT DEVICE

BACKGROUND

Technical Field

The present disclosure is related to a method for setting tire pressure measurement device.

Related Art

A tire pressure monitoring system (TPMS) usually includes a plurality of tire pressure measurement devices installed on the tires of a vehicle, wherein the tire pressure measurement devices are configured to detect whether the tire pressure of the tires is normal or not. Since 1980's, the tire pressure measurement device/TPMS has been installed on certain models of cars in Europe. In recent years, it is regulated in the United States, in Europe, and in Korea that all new cars have to be equipped with the tire pressure measurement devices to ensure driving safety. In addition, the related regulations are in force in Japan, in China, and in India in the near future. In Taiwan, it is regulated that all cars manufactured after July, 2016, should be equipped with the tire pressure measurement devices.

Most of the tire pressure measurement devices in market are the wireless tire pressure measurement devices. That is, the tire pressure measurement device on the tire does not connected to the electronic control unit of the car or the head up display via wire. In other words, the tire pressure measurement device sends the detection result to the electronic control unit or the head up display via wireless signal.

When the electronic control unit or the head up display generates the alarm signal corresponding to the tire pressure measurement device, the driver is informed that certain tire is at low pressure or certain tire pressure measurement device is out of power, so the driver would drive the car to the service center. Although the electronic control unit or the head up display shows the malfunction code, the maintenance staff of the service center usually checks the problem on his own. Hence, the maintenance staff has to communicate with the tire pressure measurement device with his handheld detection device.

However, the driver does not necessarily drive the car to the service center of the original manufacturer. For example, when the driver notices the alarm signal, there may be no service center of the original manufacturer around. In other words, the hand held detection device of the maintenance staff rarely matches with the tire pressure measurement devices installed on the car. Hence, how to make the maintenance staff easier to communicate with the tire pressure measurement device with his handheld detection device is a problem to be solved.

SUMMARY

In one embodiment of the present disclosure, a method for setting tire pressure measurement device applicable for a detection device electrically couple to an image code scanner is provided and the method comprises the steps of: providing a look-up table (LUT) recording a plurality of image codes, each of the plurality of image codes corresponding to at least one piece of manufacture information, and the at least one piece of manufacture information corresponding to a vehicle; capturing one of the plurality of image codes by the image code scanner so as to generate a scanning result; and based on the scanning result, the detection device selecting one of a plurality of communication protocols.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
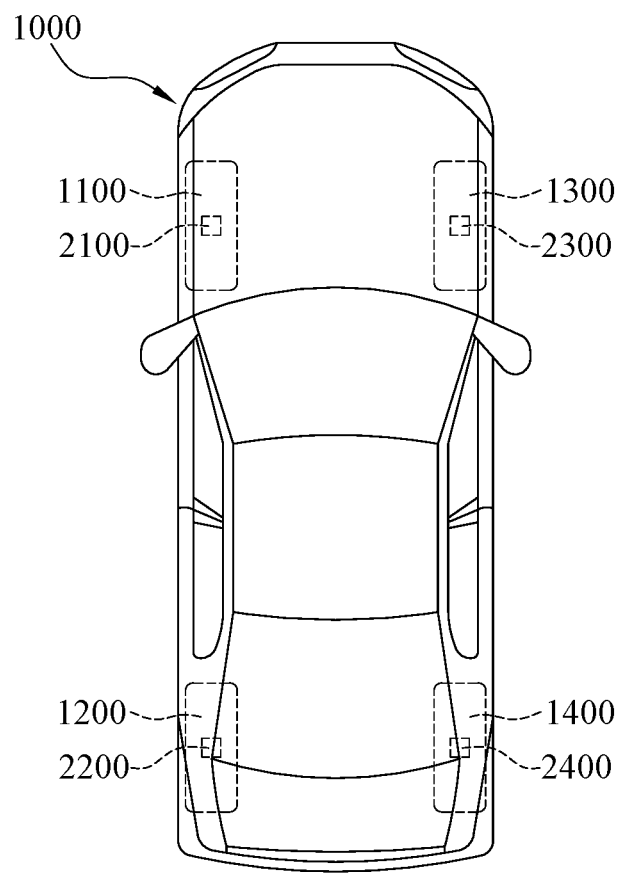
FIG. 1A illustrates a vehicle having tire pressure measurement devices thereon.
Figure 1B:
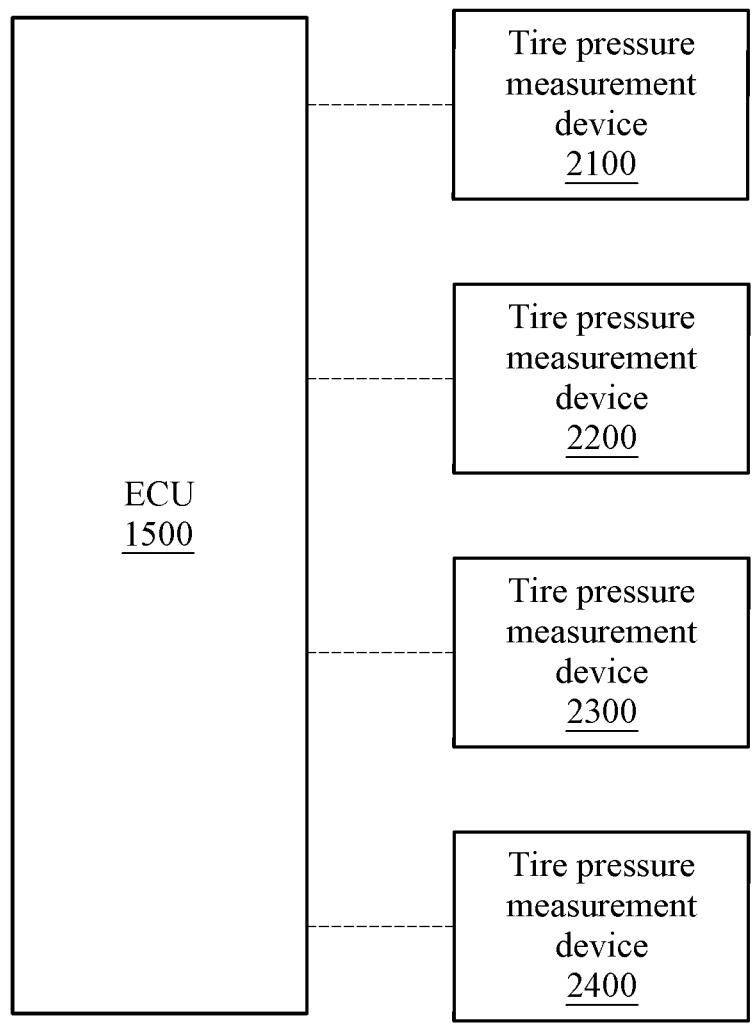
FIG. 1B illustrates a functional block diagram corresponding to FIG. 1A.

Please refer to FIG. 1A and FIG. 1B, wherein FIG. 1A illustrates a vehicle having tire pressure measurement devices thereon, and FIG. 1B illustrates a functional block diagram corresponding to FIG. 1A. In this disclosure, the vehicle means a vehicle with tires such as a motorcycle, a car, a bus, a truck, or any other kinds of vehicles with tires. The present disclosure does not intend to limit the scope to certain kind, tonnage, displacement, or limitation of number of passengers. In FIG. 1A and FIG. 1B, a four-seated car is taken for example. The vehicle 1000 in FIG. 1A has four tires 1100, 1200, 1300, and 1400. The tire pressure measurement devices 2100, 2200, 2300 and 2400 are installed on the four tires 1100, 1200, 1300, and 1400. The broken lines in FIG. 1B indicates that the tire pressure measurement devices communicate with the electronic control unit (ECU) 1500 of the vehicle 1000 wirelessly.

For example, when the tire pressure of the tire 1100 is not enough, the feedback data sent from the tire pressure measurement device 2100 makes the electronic control unit 1500 to determine that the tire pressure is abnormal so as to generate an alarm signal. In addition, when the tire pressure measurement device 2100 is at low battery or malfunction status so that the electronic control unit 1500 cannot receive the feedback data from the tire pressure measurement device 2100, the electronic control unit 1500 is going to display the alarm signal on the panel of the vehicle 1000. Usually, when the driver notices the alarm signal, he or she is going to drive the vehicle 1000 to the service center for inspection and repair.

In the service center, the maintenance staff has to check which the problem is, the tire pressure measurement device malfunctioning or low tire pressure. In this procedure, the maintenance staff has to communicate with the tire pressure measurement device so as to find out which tire or which tire pressure measurement device result in the alarm signal.

Generally, the tire pressure measurement devices 2100~2400 are classified as the embedded tire pressure measurement devices or the airtight tire pressure measurement devices. The embedded tire pressure measurement device is installed inside the tire while the airtight tire pressure measurement device is installed on the gas nozzle of the tire. The embedded tire pressure measurement device occupies most of the market because the airtight tire pressure measurement device is easy to be stolen or easy to be influenced by environment. However, the embedded tire pressure measurement device is installed inside the tire, so the maintenance staff hardly knows the model of the tire pressure measurement device before the tire is disassembled. However, the tire pressure measurement devices 2100~2400 need to communicate with the electronic control unit 1500 of the vehicle 1000, so the communication protocol of the tire pressure measurement devices 2100~2400 must match with the communication protocol of the electronic control unit 1500 of the vehicle. Hence, in the disclosed method, the communication protocol of the tire pressure measurement device is determined based on the manufacture information of the vehicle 1000.

Figure 2:
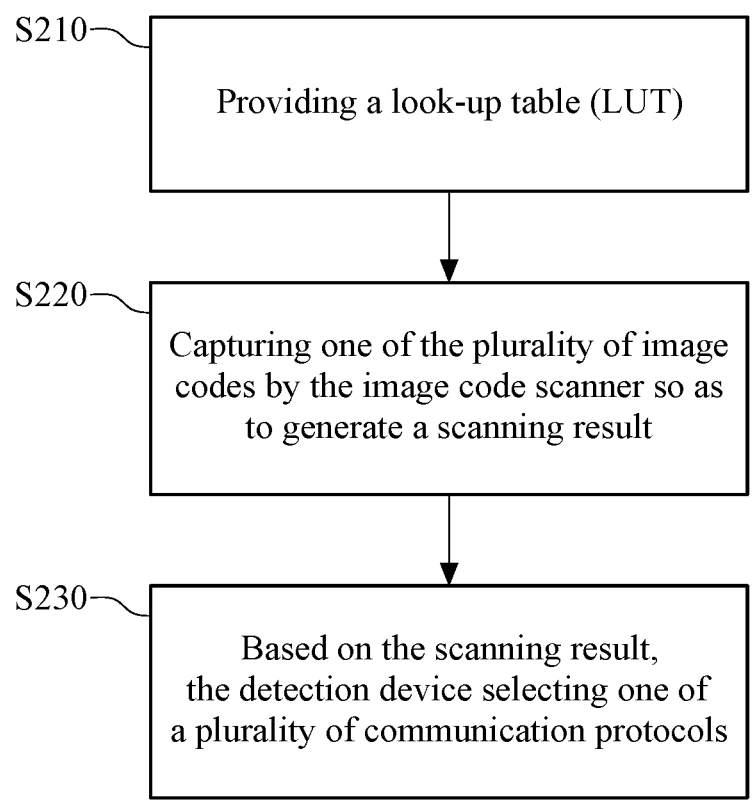
FIG. 2 is a flowchart of a method according to one embodiment of the present disclosure.
Figure 3:
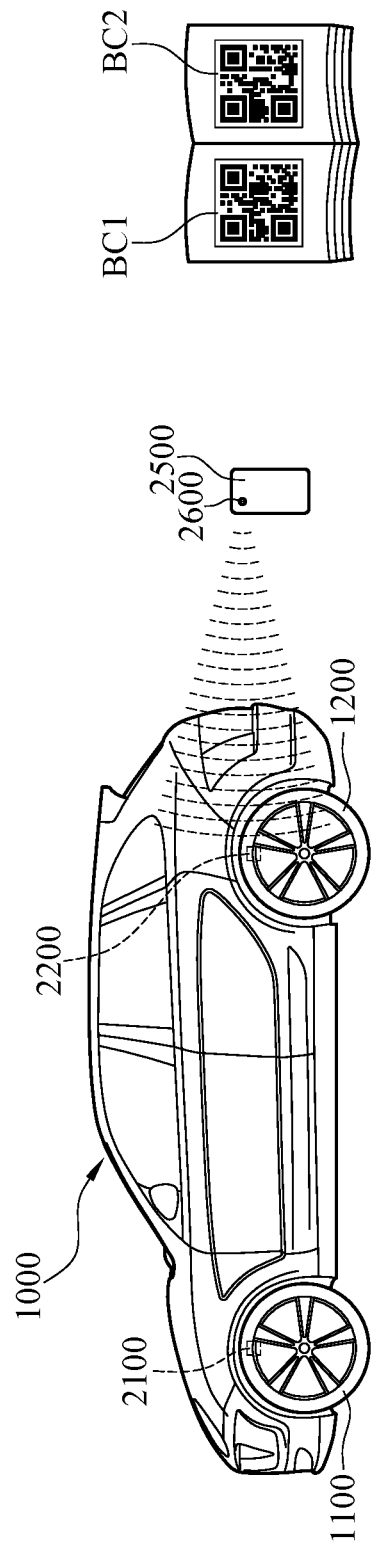
FIG. 3 is an operational diagram according to one embodiment of the present disclosure.

Please refer to FIG. 2 and FIG. 3 together, wherein FIG. 2 is a flowchart of a method according to one embodiment of the present disclosure, and FIG. 3 is an operational diagram according to one embodiment of the present disclosure. In the following examples, the hand held detection device is taken for example, but the detection device may be installed on the positioning device in the service center in other embodiments. In the disclosed method, the maintenance staff of the service center may use a look-up table recording many image codes and each image code is corresponding to at least one piece of manufacture information, wherein the piece of manufacture information is corresponding to certain one vehicle (step S210). In one embodiment, the look-up table is provided by the provider of the tire pressure measurement device. In another embodiment, the look-up table is arranged by the service center. Explicitly, please refer to table I below, wherein table I is an exemplary example of the look-up table according to one embodiment of the present disclosure.

TABLE I

| Manufacturer | Year of manufacture | Model | image code |
|---|---|---|---|
| Manufacturer A | 2015 | Model 001 | First image code |
| | 2016 | | second image code |
| Manufacturer B | 2014 | Model 002 | third image code |
| | 2015 | | |
| | 2016 | | fourth image code |

In other words, the look-up table can be used for listing the image codes corresponding to certain manufacturers, years of manufacture, and models, and each image code is actually corresponding to one communication protocol and/or parameter. In other embodiments, the look-up table can include other reference information related to the manufacture information so as to allow the maintenance staff to search. The communication protocol is, for example, wireless communication with certain frequency/band, wherein the modulation of the wireless communication is, for example, amplitude modulation, frequency modulation, phase modulation, amplitude shift keying, frequency shift keying, phase shift keying, or other applicable modulation. The definition of the packet of the wireless signal is, for example, definition of the fields in one packet, the information in each field in one packet, the definition of the wireless signal parameter, etc.

The maintenance staff can use the image code scanner 2600 electrically coupled to the handheld detection device 2500 to read the image code based on the manufacturer, the year of manufacture, and/or the model of the vehicle 1000 so as to generate a scanning result, as shown in step S220. Afterwards, the handheld detection device 2500 is capable of selecting one among the plurality of communication protocols based on the scanning result, as shown in step S230. The look-up table, in one embodiment, is represented as the document provided by the service center. In other embodiments, the look-up table, however, is shown on display screen of the computer of the service center. In one embodiment, after the image code is decoded, the handheld detection device 2500 can access a corresponding address in the server of the service center. Hence, after the image code scanner 2600 electrically coupled to the handheld detection device 2500 reads the image code, the handheld detection device 2500 then downloads the communication protocol from that address in the server of the service center. In another embodiment, the image code only includes the code and/or the parameters of the corresponding communication protocol, and after the image code scanner 2600 reads the image code, the handheld detection device 2500 performs a self-configuration based on the code and/or the parameters so as to communicate with the tire pressure measurement device by the communication protocol corresponding to the image code.

The communication protocol selected by the maintenance staff of the service center using the handheld detection device 2500 is the communication protocol utilized by the electronic control unit 1500 of the vehicle 1000. In other words, the handheld detection device 2500, after being set, is capable of wirelessly communicating with the tire pressure measurement devices 2100~2400 with similar/identical way as the electronic control unit 1500 of the vehicle 1000.

For example, when the driver drives the vehicle which is a model 001 vehicle produced by the manufacturer A in 2016 on highway, if he/she finds out that the panel of the vehicle shows the alarm signal corresponding to the tire pressure measurement device, the driver would, for his own safety, drive the vehicle to leave the highway via the interchange and go to the service center of the original manufacturer A for detection and maintenance. If the driver finds out that there is no service center of the original manufacturer A around, the driver may choose to drive to the nearest service center.

In one embodiment, the maintenance staff of the service center gets the look-up table first and determines that the vehicle is model 001 manufactured by the manufacturer A in 2016 by looking at the vehicle and based on his own knowledge. For example, he may determines directly based on the appearance of the vehicle 1000, or based on the engine number of the vehicle 1000, or the number on the vehicle 1000 or on the chassis of the vehicle 1000. The maintenance staff may search in the look-up table and find one page documenting the first image code BC1 and the second image code BC2, the maintenance staff then uses image code scanner 2600 electrically coupled to the handheld detection device 2500 to read the second image code BC2. Then, the handheld detection device 2500 selects the communication protocol identical to the communication protocol utilized by the electronic control unit 1500, which is a model 001 vehicle manufactured by the manufacturer A in 2016.

In another embodiment, the maintenance staff of the service center may ask the driver to provide the document corresponding to the vehicle such as the license of the vehicle or the maintenance manual of the vehicle and then the maintenance staff scans the document so that the computer of the service center recognizes, from the document and by optical character recognition, that the manufacturer of the vehicle, the year of manufacture, and the model of the vehicle. Then, the computer shows the second image code BC2 on the screen.

In one embodiment, the maintenance staff takes the handheld detection device to get close to the tire 1100 of the vehicle 1000, and controls the handheld detection device 2500 to call the tire pressure measurement device 2100 installed on the tire 1100 of the vehicle 1000 with the selected communication protocol. In another embodiment, the maintenance staff may choose to call any one among the tire pressure measurement devices. The calling operation here refers to the action by which the handheld detection device 2500 tries to establish a communication connection with the tire pressure measurement device 2100. In one embodiment, the handheld detection device 2500 sends correction polling signal based on the regulation of the communication protocol. If the battery of the tire pressure measurement device 2100 has some power, the tire pressure measurement device 2100 responds to the handheld detection device 2500. Even if the feedback data sent from the tire pressure measurement device 2100 is too weak in signal strength to be received by the electronic control unit 1500 of the vehicle 1000, the feedback data may be received by the handheld detection device 2500 because the handheld detection device 2500 can be moved to be close to the tire pressure measurement device 2100.

In one embodiment, after the handheld detection device 2500 receives the feedback data from the tire pressure measurement device 2100, the handheld detection device 2500 reads/parses the feedback data from the tire pressure measurement device 2100. The feedback data at least includes a first identification code of the tire pressure measurement device 2100. The first identification code is, for example, the number on the tire pressure measurement device 2100, or the code corresponding to a specified field in the packet of the feedback data of the tire pressure measurement device 2100 so as to allow the electronic control unit 1500 of the vehicle 1000 to identify the source of the feedback data. Hence, the handheld detection device 2500 is capable of recording the first identification code of the tire pressure measurement device 2100 in its embedded storage medium. In another embodiment, the feedback data further includes the battery status and/or the position of installation of the tire pressure measurement device 2100. For example, the tire pressure measurement device 2100 is capable of sending the information such as whether the battery is out of power, the power in battery, which wheel the tire pressure measurement device is installed on, etc., to the handheld detection device 2500. In one embodiment, the handheld detection device 2500 has a display, so the information received by the handheld detection device 2500 is shown on the display for the maintenance staff and/or the driver. In another embodiment, the handheld detection device 2500 sends the received information to the server of the service center, via wire or wirelessly, so the computer of the service center and/or other technician can analyze the information.

Further, in certain model of vehicle, the required tire pressure of the front wheel is different from that of the rear wheel, so the electronic control unit has to receive the tire pressure and the position of installation from each of the tire pressure measurement devices. For example, because of the weight of certain model of vehicle, the tire pressure of its front wheel should be ranged between 35 psi and 37 psi while the tire pressure of its rear wheel should be ranged between 32 psi and 33 psi. When the electronic control unit of the vehicle of this model receives information from a tire pressure measurement device indicating that its position of installation is left rear wheel and its tire pressure is 33 psi, the electronic control unit determines that the tire pressure is normal. If the information indicates that the position of installation is left front wheel and the tire pressure is 34 psi, the electronic control unit will determine that the tire pressure is too low and then generates the alarm signal.

Figure 4:
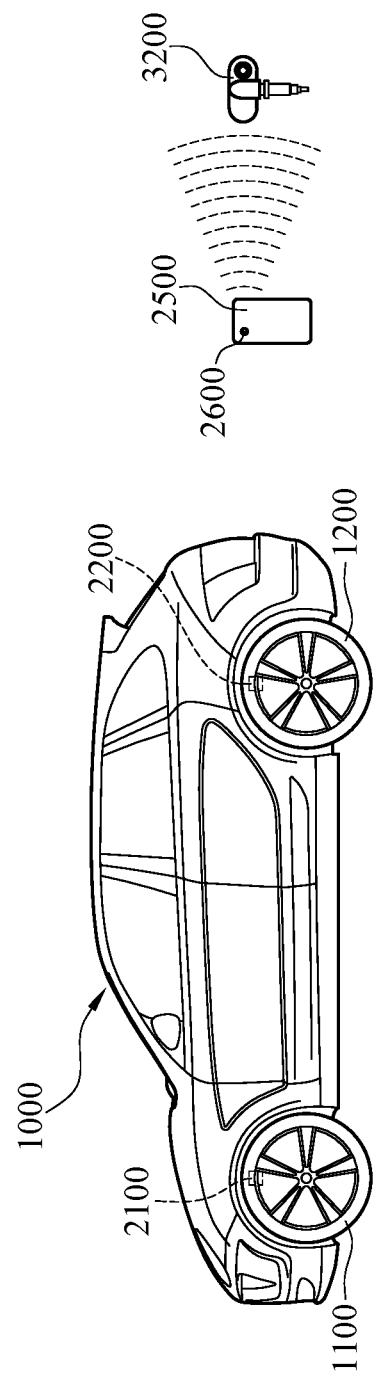
FIG. 4 is an operational diagram according to another embodiment of the present disclosure.

For example, when the maintenance staff finds out the reason of the alarm signal is that the tire pressure measurement device 2200 is out of power, so the maintenance staff gets a tire pressure measurement device 3200 for replacement from the stock of the service center. Because the tire pressure measurement device 3200 has not yet been set, the packet sent by the tire pressure measurement device 3200 cannot be identified by the electronic control unit 1500 if the tire pressure measurement device 3200 is directly installed for replacing the tire pressure measurement device 2200. In such condition, the electronic control unit 1500 cannot get the feedback data from the tire pressure measurement device 3200. Hence, in one embodiment, please refer to FIG. 4, which is an operational diagram according to another embodiment of the present disclosure. The method in the present disclosure further includes the step of writing the identification code of the tire pressure measurement device 2200 and the selected communication protocol, the communication code corresponding to the second image code BC2, into the tire pressure measurement device 3200. Hence, the tire pressure measurement device 3200 sends the feedback data based on the selected communication protocol, and the electronic control unit 1500 is capable of reading the feedback data from the tire pressure measurement device 3200. Further, because the identification code of the tire pressure measurement device 2200 has been written into the tire pressure measurement device 3200, the feedback data from the tire pressure measurement device 3200 includes the identification code of the tire pressure measurement device 2200, so the electronic control unit 1500 identifies the tire pressure measurement device 3200 as the tire pressure measurement device 2200. In this way, the replacement of the tire pressure measurement device can be done by the service center. With the aforementioned flow, the replacement of the tire pressure measurement device may be done by the service center of the original manufacturer or by any service center. Further, the service center needs not prepare the stock of the tire pressure measurement device for every type of vehicles. In other words, the handheld detection device 2500 in this embodiment can be seen as the setting apparatus or the burning apparatus for the tire pressure measurement device. In another embodiment, the handheld detection device 2500 further writes the position of installation received from the tire pressure measurement device 2200 into the tire pressure measurement device 3200.

In one embodiment, before the maintenance staff sets the tire pressure measurement device 3200, he/she has used the handheld detection device 2500 to call the tire pressure measurement devices 2100~2400 one by one. Hence, the handheld detection device 2500 has obtained the identification code of each of the tire pressure measurement devices 2100~2400. In this embodiment, when the handheld detection device 2500 sets the tire pressure measurement device 3200, the handheld detection device 2500 not only writes the identification code of the tire pressure measurement device 2200 into the tire pressure measurement device 3200, but the identification codes corresponding to the tire pressure measurement devices 2100~2400 as well. Hence, when the driver drives the vehicle 1000 to the service center next time, the maintenance staff may obtain the identification codes of all of the tire pressure measurement devices 2100~2400 by reading the feedback data from the tire pressure measurement device 3200.

In another embodiment, the identification code of the tire pressure measurement device 3200 may indicate the time of manufacture, the warranty period or other important information, so the handheld detection device 2500 may read the identification code of the tire pressure measurement device 3200 before setting the tire pressure measurement device 3200. The handheld detection device 2500 also writes the identification code of the tire pressure measurement device 2200 and the identification code of the tire pressure measurement device 3200 into the tire pressure measurement device 3200. Therefore, when the driver drives the vehicle 1000 to the service center next time, the maintenance staff may obtain the important information of the tire pressure measurement device 3200 such as the time of manufacture and the warranty period by reading the feedback data from the tire pressure measurement device 3200.

In another embodiment, because the tire pressure measurement devices are installed onto the vehicle 1000 substantially at the same time. If the tire pressure measurement device 2200 is out of power, other tire pressure measurement devices 2100, 2300 and 2400 should be also at low battery. Hence, some driver may choose to replace all tire pressure measurement device at once. Based on such need, the present disclosure provides a method for setting tire pressure measurement devices in batch, wherein the method, successive to the step S230, further comprises the following steps: the maintenance staff of the service center removes the tire pressure measurement devices 2100~2400 from the tires 1100~1400 of the vehicle 1000. Then the maintenance staff uses the handheld detection device 2500 to read the identification code of the tire pressure measurement device 2100, the identification code of the tire pressure measurement device 2200, the identification code of the tire pressure measurement device 2300, and the identification code of the tire pressure measurement device 2400, and then makes the tire pressure measurement devices 2100~2400 to send feedback data with the selected communication protocol, as the aforementioned method.

Figure 5:
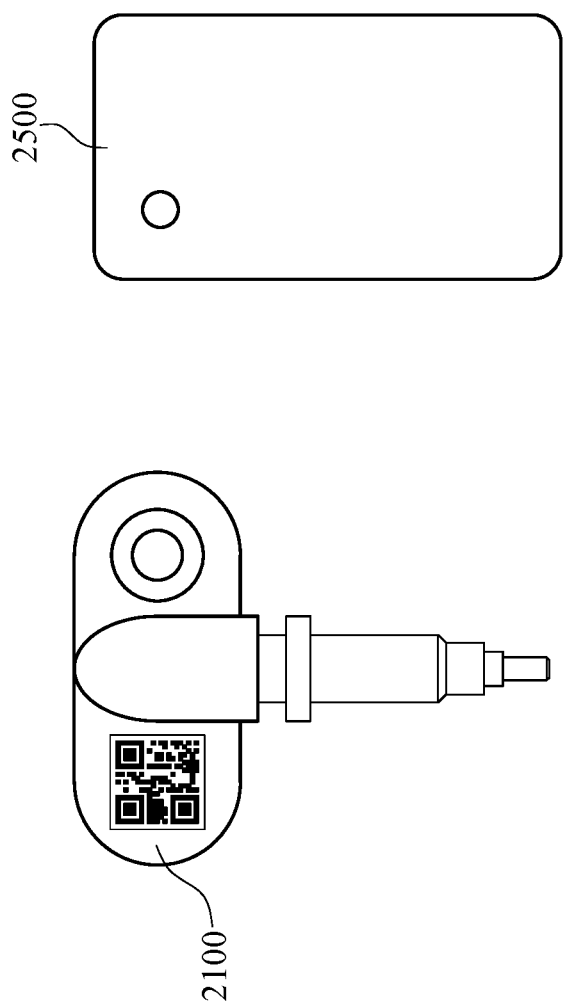
FIG. 5 is an operational diagram according to yet another embodiment of the present disclosure.

In addition, please refer to FIG. 5 for another embodiment, wherein FIG. 5 is an operational diagram according to yet another embodiment of the present disclosure. There is an identification code, an one-dimensional bar code or a two-dimensional bar code, disposed on the surface of each of the tire pressure measurement devices 2100~2400, wherein the tire pressure measurement device 2100 is taken for example in FIG. 5. The identification code is on a sticker stacked on the surface of the tire pressure measurement device or laser engraved or chemical etched on the surface of the tire pressure measurement device. In this embodiment, the tire pressure measurement device may be an embedded tire pressure measurement device or an airtight tire pressure measurement device. However, the embedded tire pressure measurement device is a better choice because the embedded tire pressure measurement device can hardly be broke by foreign body.

In the embodiment, when the operation of calling the tire pressure measurement device 2100 by the handheld detection device 2500 fails, it may be of the reason that the battery of the tire pressure measurement device 2100 is out of power. In this condition, if the tire pressure measurement device 2100 is an embedded tire pressure measurement device, the maintenance staff may remove the tire 1100 and take the tire pressure measurement device 2100. Then the maintenance staff uses the image code scanner 2600 electrically coupled to the handheld detection device 2500 or other scanner to scan the identification code on the surface of the tire pressure measurement device 2100. If the tire pressure measurement device 2100 is an airtight tire pressure measurement device, the maintenance staff can directly use the image code scanner 2600 or other scanner to scan the identification code on the surface of the tire pressure measurement device 2100 without removing the tire 1100. Explicitly, the aforementioned operations by the maintenance staff are not necessarily performed only when one of the tire pressure measurement devices 2100~2400 is out of power, the maintenance staff may execute the aforementioned operations any time necessary.

Figure 6:
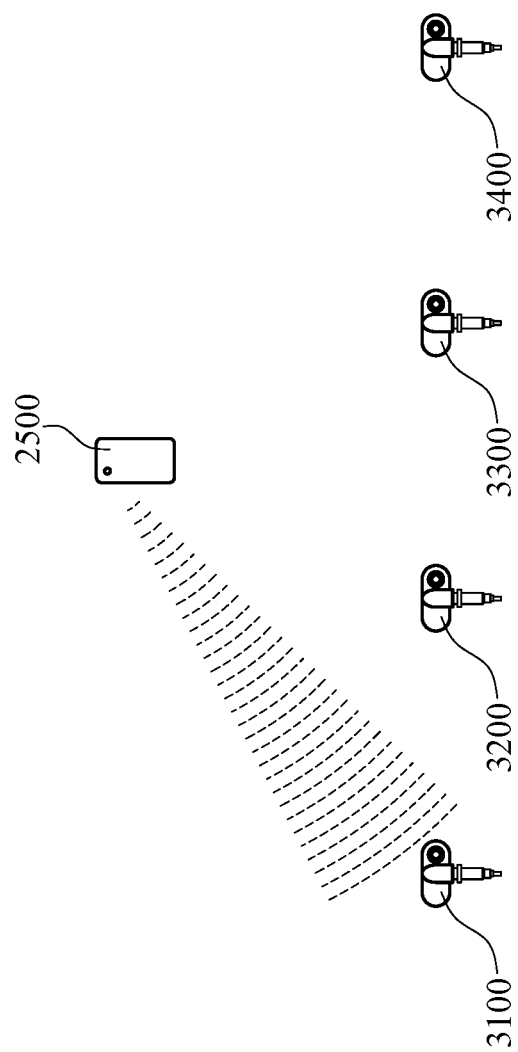
FIG. 6 is an operational diagram according to another embodiment of the present disclosure.

Please refer to FIG. 6, which is an operational diagram according to another embodiment of the present disclosure. After the identification codes of all tire pressure measurement devices 2100~2400 are read, the maintenance staff prepares the tire pressure measurement devices 3100~3400 and sets the handheld detection device 2500 so that the handheld detection device 2500 respectively writes the identification codes of the tire pressure measurement devices 2100~2400 and the selected communication protocol into the tire pressure measurement devices 3100~3400.

In one embodiment, the tire pressure measurement devices 3100~3400 all have the preset standard communication protocol, and the standard communication protocol may be defined by the producer of the tire pressure measurement device. Usually, the standard communication protocol is different from the communication protocol utilized by the electronic control unit 1500 of the vehicle 1000. When the maintenance staff set the tire pressure measurement devices 3100~3400 by the handheld detection device 2500, the handheld detection device 2500 at first sends the polling signal to the tire pressure measurement devices 3100~3400 with the standard communication protocol, and the tire pressure measurement devices 3100~3400 send the feedback data respectively to the handheld detection device. In the embodiment, the feedback data of the tire pressure measurement device 3100 includes the identification code of the tire pressure measurement device 3100.

In one embodiment, because the handheld detection device 2500 has obtained the identification codes of the four tire pressure measurement devices 2100~2400, so the handheld detection device 2500 is capable of continuously sending the polling signal with the standard communication protocol before it receives the identification codes of the four tire pressure measurement devices 3100~3400. Then, the handheld detection device 2500 is capable of sending the writing instruction, the selected communication protocol by reading the second image code BC2, and the identification code of the tire pressure measurement device 2100 to the tire pressure measurement device 3100 with the standard communication protocol and the identification code of the tire pressure measurement device 3100. Hence, the tire pressure measurement device 3100 would, based on the writing instruction, write the selected communication protocol and the identification code of the tire pressure measurement device 2100 into its storage medium. After the writing procedure is accomplished, the tire pressure measurement device 3100 would send a confirmation signal to the handheld detection device 2500, and the handheld detection device 2500 sends a reset signal responsively to the tire pressure measurement device 3100. Hence, the tire pressure measurement device 3100 restarts and operates with the identification code of the tire pressure measurement device 2100 and the selected communication protocol. With the aforementioned procedure, the handheld detection device 2500 is capable of sequentially setting the tire pressure measurement devices 3100~3400 to replace the tire pressure measurement devices 2100~2400.

As above, in the method for setting the tire pressure measurement device based on one embodiment of the present disclosure, the communication protocol of the electronic control unit of one vehicle is obtained by reading the image code so as to set the detection device with the communication protocol and make the detection device able to communicate with the tire pressure measurement device. Hence, the complexity of operation is reduced and the efficiency of the maintenance staff is improved.

What is claimed is:

1. A method for setting a tire pressure measurement device, comprising:
    providing a detection device electrically coupled with an image code scanner for identifying a tire pressure measurement device installed in a vehicle and detecting status of the tire pressure measurement;
    capturing one of a plurality of image codes recorded in a look-up table (LUT) by using the image code scanner so as to generate a scanning result, each of the plurality of image codes corresponding to at least one piece of manufacture information, and the at least one piece of manufacture information corresponding to a vehicle model; and
    selecting one of a plurality of communication protocols based on the scanning result so as to establish a connection setting between the detection device and the tire pressure measurement device based on the selected communicated protocol.

2. The method in claim 1, further comprising:
    calling a first tire pressure measurement device installed on the vehicle with the selected communication protocol.

3. The method in claim 2, further comprising:
    reading a segment of feedback data of the first tire pressure measurement device, wherein the segment of feedback data at least comprises a first identification code of the first tire pressure measurement device.

4. The method in claim 3, wherein the segment of feedback data further comprises a battery status of the first tire pressure measurement device and a position of installation of the first tire pressure measurement device.

5. The method in claim 3, further comprising:
    writing the first identification code and the selected communication protocol into a second tire pressure measurement device.

6. The method in claim 1, further comprising:
    reading a first identification code of a first tire pressure measurement device and a second identification code of a second tire pressure measurement device;
    writing the first identification code and the selected communication protocol into a third tire pressure measurement device; and
    writing the second identification code and the selected communication protocol into a fourth tire pressure measurement device.

7. The method in claim 6, wherein the step of reading the first identification code and the second identification code comprises:
    calling the first tire pressure measurement device with the selected communication protocol;
    reading a segment of first feedback data of the first tire pressure measurement device after successfully calling the first tire pressure measurement device, wherein the segment of first feedback data at least includes the first identification code of the first tire pressure measurement device;
    calling the second tire pressure measurement device with the selected communication protocol; and
    reading a segment of second feedback data of the second tire pressure measurement device after successfully calling the second tire pressure measurement device, wherein the segment of second feedback data at least includes the second identification code of the second tire pressure measurement device.

8. The method in claim 6, wherein the step of reading the first identification code of the first tire pressure measurement device and the second identification code of the second tire pressure measurement device comprises:
    scanning the first identification code disposed on a surface of the first tire pressure measurement device by the image code scanner; and
    scanning the second identification code disposed on a surface of the second tire pressure measurement device by the image code scanner.

9. The method in claim 6, further comprising:
    determining whether or not a confirmation signal from the third pressure measurement device is received; and
    sending a reset signal to the third pressure measurement device after the confirmation signal from the third pressure measurement device is received so as to make the third tire pressure measurement device reset with the first identification code of the first tire pressure measurement device and the selected communication protocol.

10. The method in claim 1, further comprising scanning a first identification code disposed on a surface of the tire pressure measurement device by the image code scanner.

* * * * *